June 20, 1944.  F. C. BEST  2,351,803
MOTOR VEHICLE
Filed April 21, 1939  2 Sheets-Sheet 1
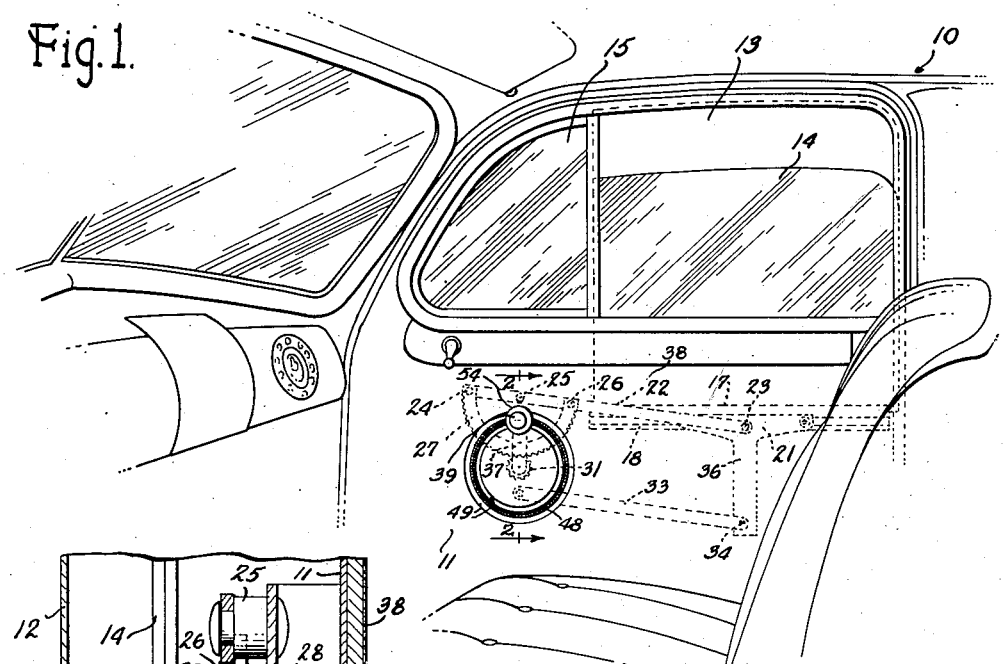
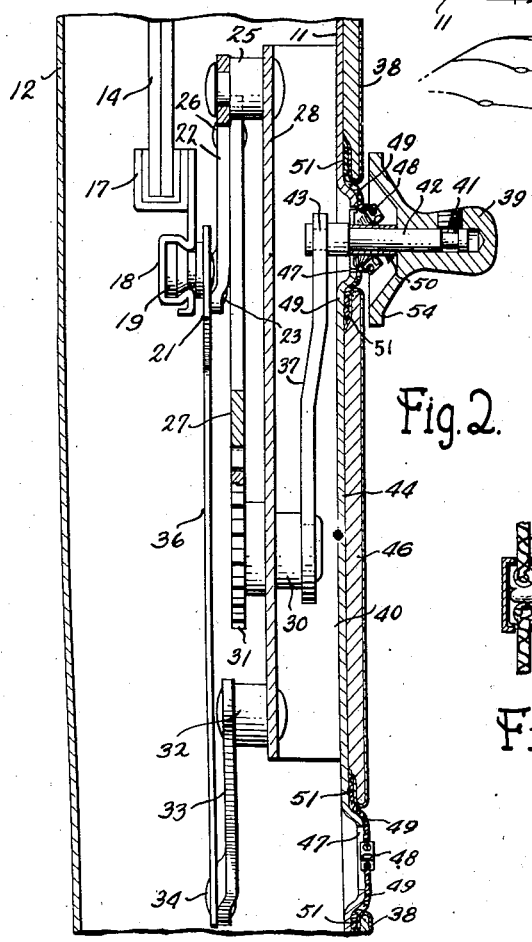
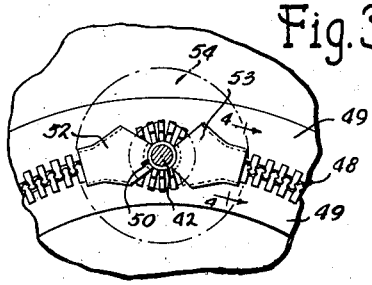
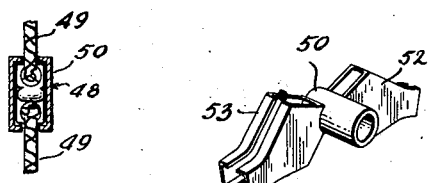
Fig.1. Fig.2. Fig.3. Fig.4. Fig.5.
INVENTOR.
Frank C. Best
BY
ATTORNEYS

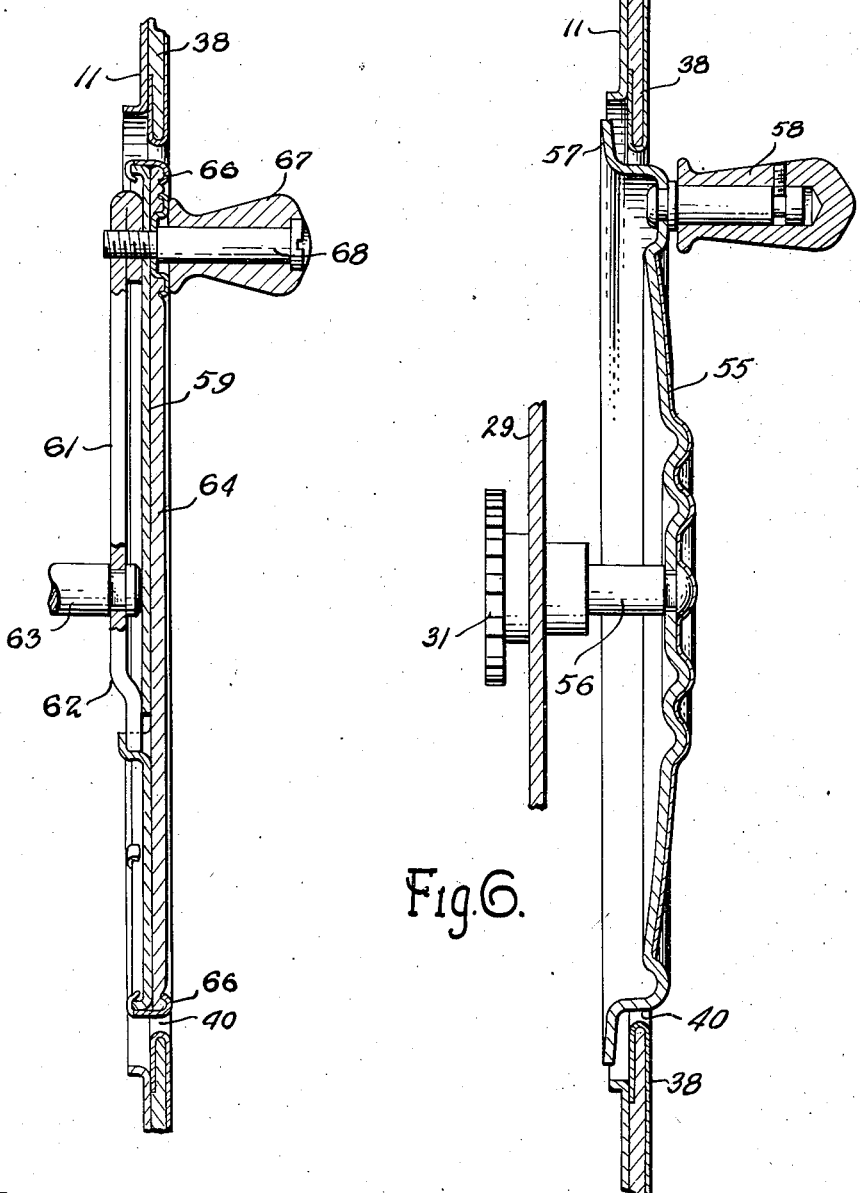

Patented June 20, 1944

2,351,803

UNITED STATES PATENT OFFICE 2,351,803

MOTOR VEHICLE

Frank C. Best, Detroit, Mich., assignor to Packard Motor Car Company, Detroit, Mich., a corporation of Michigan Application April 21, 1939, Serial No. 269,204

7 Claims. (Cl. 296—44)

This invention relates to motor vehicles and particularly to the window regulating mechanism and panel construction thereof.

At present the movable windows of motor vehicle bodies are usually actuated by regulator mechanism which is manually controlled by crank arms or similar devices protruding from the body side walls interiorly of the passenger compartment. Such constructions not only detract from the appearance of the body interior, but often form objectionable obstructions to passenger comfort.

It is therefore an object of the present invention to provide window regulating mechanism incorporated in a vehicle body in a manner to eliminate protrusion of the conventional crank arm into the passenger compartment.

It is a further object of the invention to provide means for substantially concealing the entire window regulating mechanism.

Another object of the invention is to provide an improved manual control for a window regulator.

Still another object resides in the provision of a vehicle body so constructed as to receive window regulator mechanism in a manner to eliminate the protrusion of the conventional crank arm control into the passenger compartment.

Other objects and advantages of the invention will become apparent from the following description taken in connection with the following drawings in which:

Fig. 1 is a fragmentary view of the interior of a passenger motor vehicle embodying the present invention;

Fig. 2 is a sectional view taken substantially on the line 2—2 of Fig. 1;

Fig. 3 is an enlarged fragmentary elevational view of the slide fastener construction employed in connection with the present invention;

Fig. 4 is a sectional view of one of the slide fastener collectors taken substantially on the line 4—4 of Fig. 3;

Fig. 5 is a perspective view showing the slide fastener collectors mounted on the manual control shaft;

Fig. 6 is a fragmentary vertical sectional view of another form of the present invention; and Fig. 7 is a similar view of still another form the invention may assume.

Referring to the drawings, reference numeral 10 indicates a passenger vehicle having a door structure comprising spaced inner and outer side panels 11 and 12 respectively, forming window openings 13 arranged to receive a vertically slidable window glass 14 and a pivoted wing glass 15. A bracket 17 is fixed to the lower edge of the slidable glass 14 and is provided with a longitudinal channel member 18 to receive the bearing pins 19 of a regulating bar 21. A regulator arm 22 is pivoted to the regulating bar 21 as at 23 and extends forwardly in the door structure, where it is fixed at 24 and 26 to the upper portion of a gear segment 27 which in turn is centrally pivoted adjacent its upper edge, as at 25, to a support 28 forming a part of the door. The teeth of the gear segment 27 are positioned to be engaged by the teeth of an actuating gear 31 having a shaft 30 rotatably mounted on the support 28. A guide arm 33 is positioned in parallel relation to the regulator arm 22 and is pivoted as at 34 to a depending extension 36 of the regulating bar 21 and is also pivoted to the body support 28 as at 32.

The shaft 30 of the actuator gear 31 carries an operating crank or lever 37 extending radially therefrom and positioned behind the vertical plane of the inner body panel 11. The free end of this lever is adapted to be manually oscillated to cause rotation of the actuator gear 31, which in turn effects a rocking movement of the gear segment 27 to raise or lower the regulator arm 22, regulating bar 21, and window glass 14, the guide arm 33 acting to retain the regulating bar in a horizontal position to prevent binding of the window glass in its channels.

In accordance with the present invention, all of the window regulating mechanism, including the operating lever 37, is carried between the body panels 11 and 12 and behind the plane of the inner panel 11 to be concealed from view. With such construction and arrangement of parts, it is possible to effect operation of the window regulating mechanism from the interior of the vehicle with only a small, manually operable handle protruding into the passenger compartment.

To permit a knob to extend from the interior of the vehicle to the operating lever 37, the inner panel 11 and its interior trim material 38 is formed with a through opening 40 which may be circular in form and located concentrically to the axis of the actuator gear 31 of the regulating mechanism, the diameter of such opening being slightly greater than that of the arc or circle described by the free end of the lever 37.

For actuating the crank lever 37, a manually operable handle or knob 39 is rotatably mounted exteriorly of the inner panel 11, as at 41, upon a pin 42 extending through the circular opening 40 and which is secured in fixed relation to the free end of the operating lever 37 as at 43. Thus, manual oscillation of the handle 39 will cause the operating lever 37 to be moved in an arc, effecting rotation of the actuator gear 31 to raise or lower the window glass.

The opening 40 in the inner panel 11 may be neatly closed by the provision of a cover comprising a circular stamping 44 positioned concentrically to the axis of the actuator gear 31 and of slightly less diameter than that of the circular opening, and which may be provided with trim material 46 such as that employed throughout the interior of the vehicle. The circular stamping 44 forms a continuation of the panel 11 and being smaller in diameter than the panel opening, a slot 47 is provided to receive the pin 42 of the handle 39.

The circular cover 44 may be secured to the inner body panel 11 in the vertical plane thereof and the slot 47 closed by a slide fastener 48, circular in form, and connected through a fabric mounting 49 to the panels 11 and 44 by lapping and securing the trim 38 and 46 thereover as at 51. The pin 42 of the handle 39 may extend through a boss of a double ended slider 50 having oppositely disposed fastener collectors 52 and 53. The handle 38 may be formed with a circular flange 54 of such diameter as to conceal the fastener collectors from view. The details of the fastener elements may be similar to those shown in patent to Murphy No. 1,934,084, November 7, 1933.

It will thus be seen that movement of the handle 39 and its pin 42 in either direction will cause a similar movement of the slider 50 and that the leading collector thereof will serve to open the fastener 48 to permit the pin 42 to pass therebetween, the follower collector serving to immediately close the fastener 48 behind the movement of the pin. Accordingly, at no time is there an opening in the fastener 48 larger than is sufficient to permit the pin 42 to pass therethrough. Inasmuch as the flange 54 on the handle 39 covers the collectors 52 and 53 and the opening for the pin 42, only the circular, closed fastener and cover 46 and the small protruding handle 39 are visible to the operator from the interior of the vehicle, and the cover 46 remains stationary as the handle is rotated.

The invention may assume a slightly different form as shown in Fig. 6. In this form a decorative circular cover 55 may be positioned in the panel opening 40 and concentrically connected directly to the actuator gear 31 through a shaft 56. The cover 55 may be provided with a peripheral flange 57 to the rear of the trim 38 and extending radially beyond the limits of the opening 40. The cover 55 may also be provided with a small manual knob 58 adjacent its periphery and extending into the passenger compartment.

A further form of the invention is shown in Fig. 7 and comprises a cover stamping 59 positioned in the opening 40 in the plane of the inner panel 11 and having an operating lever 61 bent rearwardly therefrom as at 62 and connected to the shaft 63 of the actuator gear 31, not shown. Interior trim material may be secured to the stamping 59 by a decorative, beaded ring 66 and a handle 67 may be secured to the assembly by means of a pin 68 passing through the trim 64, the stamping 59 and the free end of the operating lever 61. Except that the covers 55 and 59 turn with the handles, the operation of this form and that of Fig. 6 is generally similar to that previously described in connection with the disclosure of Fig. 2 and will be well understood by those skilled in the art.

It will be obvious that various modifications in construction and design may be made without departing from the spirit or scope of the invention, which is to be limited only by the appended claims.

What is claimed and desired to be secured by Letters Patent is:

1. In a vehicle, a body having spaced inner and outer panels and a movable window glass, said inner panel being formed with an opening therein, window regulating mechanism carried by one of said panels, an operating handle for said mechanism connected to move within the limits of said opening, a cover for said opening, means securing said cover to said inner panel, and means associated with said handle and said securing means for opening one part of said cover and closing another as said handle is moved.

2. In a vehicle, a body having spaced inner and outer panels and a movable window glass, said inner panel being formed with an opening therein, window regulating mechanism, an operating handle connected to said mechanism and adapted to move within the limits of said opening, a cover for said opening, a slide fastener securing said cover to said inner panel, and means connected to move with said handle for opening and closing said slide fastener.

3. In a vehicle, a body having spaced inner and outer panels and a movable window glass, said inner panel being formed with an opening therein, window regulating mechanism, an operating handle connected to said mechanism and adapted to move within the limits of said opening, a cover for said opening, a slide fastener securing said cover to said inner panel, and a pair of oppositely disposed collectors for said fastener carried by said handle whereby said fastener will be opened preceding the movement of the handle in either direction and closed directly behind such movement.

4. In a vehicle, a body having spaced inner and outer panels and a movable window glass, said inner panel being formed with an opening therein, window regulating mechanism carried by one of said panels, an operating handle for said mechanism connected to move within the limits of said opening, a cover for said opening, a slide fastener securing said cover to said inner panel, oppositely disposed collectors for said fastener carried by said handle whereby said fastener is opened preceding the movement of the handle in either direction and closed directly behind such movement, and means on said handle concealing said collectors from view.

5. In a vehicle, in combination, a panel having a through circular opening therein, a mechanism arranged at one side of said panel and having an actuating handle movable within the limits of said opening and extending to the opposite side of said panel, a stationary circular cover for said opening forming a continuation of the panel to conceal said mechanism except the handle which is left uncovered for operation of the mechanism, and interconnecting means between the cover and the panel.

6. In a vehicle, the combination with a body panel having a through circular opening therein and window regulating mechanism, of an operating handle for said mechanism connected in a complete circle about an axis to move within the diameter of said opening, and a non-rotating cover for said opening supported by said panel.

7. In a vehicle, the combination with an inner body panel having a through circular opening therein and window regulating mechanism including a shaft positioned concentrically to said circular opening, of a handle connected to said shaft and adapted to be manually rotatable within such circular opening, and a non-rotating cover for said opening supported by said panel.

FRANK C. BEST.